(12) United States Patent
Keller et al.

(10) Patent No.: US 9,683,541 B2
(45) Date of Patent: Jun. 20, 2017

(54) ENERGY GENERATING UNIT

(71) Applicant: KSB Aktiengesellschaft, Frankenthal (DE)

(72) Inventors: Christoph Keller, Freinsheim (DE); Traugott Ulrich, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 244 days.

(21) Appl. No.: 14/363,536

(22) PCT Filed: Nov. 20, 2012

(86) PCT No.: PCT/EP2012/073062
§ 371 (c)(1),
(2) Date: Jun. 6, 2014

(87) PCT Pub. No.: WO2013/083396
PCT Pub. Date: Jun. 13, 2013

(65) Prior Publication Data
US 2014/0284934 A1    Sep. 25, 2014

(30) Foreign Application Priority Data

Dec. 8, 2011   (DE) .................. 10 2011 088 014

(51) Int. Cl.
*F03B 13/10*  (2006.01)
*E02B 9/04*   (2006.01)
(Continued)

(52) U.S. Cl.
CPC ............... *F03B 13/10* (2013.01); *E02B 8/08* (2013.01); *E02B 8/085* (2013.01); *E02B 9/00* (2013.01);
(Continued)

(58) Field of Classification Search
CPC .... F02B 3/04; F02B 13/10; E02B 8/08; E02B 8/085; E02B 9/00; E02B 9/02; E02B 9/04;
(Continued)

(56) References Cited

U.S. PATENT DOCUMENTS 6,715,959 B2 *  4/2004  Boylan ................... E02B 8/085
                                              405/81
7,670,083 B2 *  3/2010  McWha ................. E02B 7/005
                                              119/219
(Continued)

FOREIGN PATENT DOCUMENTS

AT           411 368 B    12/2003
DE       198 02 979 A1     7/1999
(Continued)

OTHER PUBLICATIONS

International Preliminary Report on Patentability (PCT/IB/373), including Written Opinion (PCT/ISA/237) dated Jun. 10, 2014 (Seven (7) pages).
(Continued)

*Primary Examiner* — Logan Kraft
(74) *Attorney, Agent, or Firm* — Crowell & Moring LLP

(57) ABSTRACT

An energy generating unit for generating electric energy from water power is provided. At least one turbine system is installed in a conventional standard container in a channel which rungs in the standard container. The channel is arranged in the flow direction of a surrounding body of water. A fishway is provided on or in the standard container.

4 Claims, 3 Drawing Sheets

(51) Int. Cl.
  *E02B 9/02* (2006.01)
  *E02B 8/08* (2006.01)
  *E02B 9/00* (2006.01)
  *F03B 3/04* (2006.01)

(52) U.S. Cl.
  CPC ............... *E02B 9/02* (2013.01); *E02B 9/04* (2013.01); *F03B 3/04* (2013.01); *Y02E 10/22* (2013.01); *Y02E 10/28* (2013.01)

(58) Field of Classification Search
  CPC . Y02E 10/22; F03B 3/04; F03B 13/10; Y10E 10/28
  See application file for complete search history.

(56) References Cited

U.S. PATENT DOCUMENTS 8,371,801 B2 * 2/2013 Becker .................... F03B 13/10
                                                    415/199.4

2009/0317191 A1 * 12/2009 Jang ........................ E02B 8/085
                                                    405/81

FOREIGN PATENT DOCUMENTS

| | | |
|---|---|---|
| DE | 198 07 732 A1 | 8/1999 |
| DE | 299 14 306 U1 | 1/2000 |
| DE | 20 2010 007 718 U1 | 11/2010 |
| DE | 10 2010 018 892 A1 | 11/2011 |
| WO | WO 99/27251 A1 | 6/1999 |
| WO | WO 2009/121824 A2 | 10/2009 |

OTHER PUBLICATIONS

German language Written Opinion (PCT/ISA/237) dated Feb. 19, 2013 (Five (5) pages).
German Office Action dated Sep. 28, 2012 (Three (3) pages).
International Search Report (PCT/ISA/210) dated Feb. 19, 2013, with English translation (Five (5) pages).

* cited by examiner

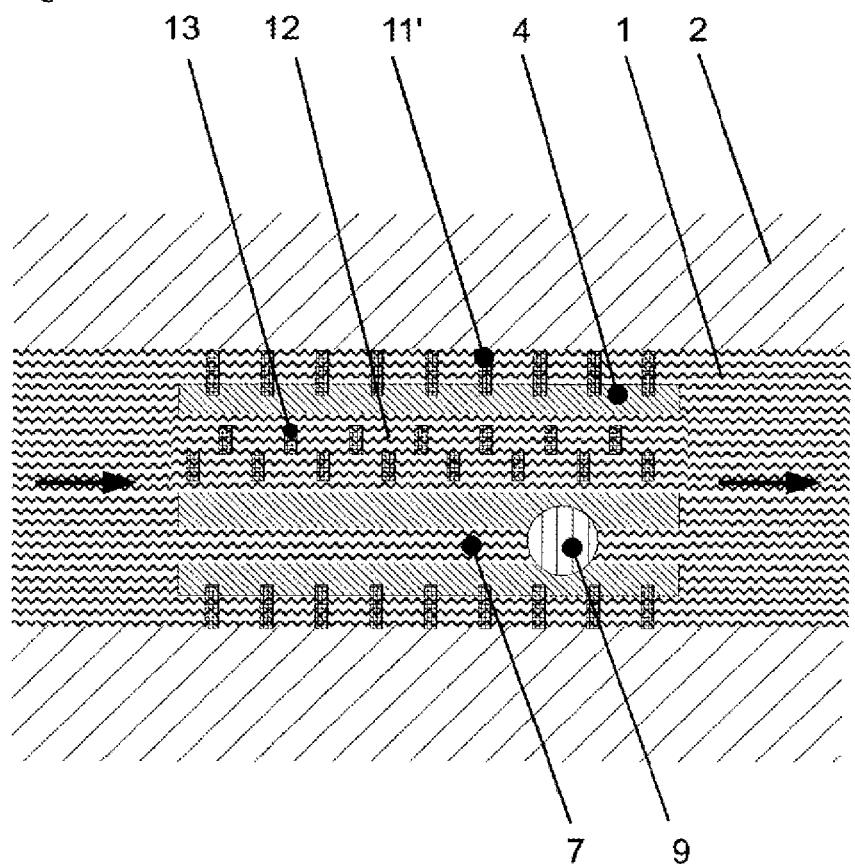

ENERGY GENERATING UNIT

This application is a National Phase of PCT International Application No. PCT/EP2012/073062, filed Nov. 20, 2012, which claims priority under 35 U.S.C. §119 from German Patent Application No. 10 2011 088 014.3, filed Dec. 8, 2011, the entire disclosures of which are herein expressly incorporated by reference.

BACKGROUND AND SUMMARY OF THE INVENTION

The invention relates to an energy generating unit for generating electrical energy from water power, wherein at least one turbine system is installed in a commercially available standard shipping container, wherein the turbine system is arranged in a channel extending inside the standard shipping container, wherein the channel is arranged in the direction of flow of a surrounding body of water.

There are many known devices for generating electricity in dammed water courses. However, on the one hand, the apparatuses impinge on the ecosystem of the body of water. In particular, the dam walls or weirs represent an insuperable obstacle for migrating fish. On the other hand, a power house needs to be constructed for maintaining the turbine. This entails further expense and further impingement on the ecosystem of the body of water.

German Utility Patent No. DE 299 14 306 U1 discloses a hydroelectric power plant which consists in part of prefabricated shipping containers. German Patent Publication No. DE 198 07 732 A1 discloses a flexible self-supporting fish ladder which can have a variable design depending on the height to be negotiated. The subject of fish ladders on a dam is described in Austrian Patent No. AT 411 368 B with a fish lift having a hydraulically closeable gate. German Patent No. DE 10 2010 018 892 B3 discloses a weir system with a turbine system and a fishway.

International Patent Publication No. WO 99/27251 A1 describes a hydraulic power plant which is installed as a whole, at least the turbine and generator of the hydraulic power plant, in a commercially available standard shipping container such as is used for marine, air, road or rail transportation. The most common example of such a commercially available standard shipping container is the standard large-capacity container according to ISO 688, which is generally known as a 20- or 40-foot shipping container.

The use of such a shipping container enables electrical energy to be provided simply and quickly in a relatively small water course. As long as there is good access, the shipping container can be set down virtually ready to connect. However, the method of generating energy ignores the question of ecologically necessary and often legally required spaces to allow fish to migrate freely. A corresponding fish ladder might in certain conditions be installed separately, which greatly reduces the advantages of a complete unit for generating energy.

The object of the present invention is to provide an energy generating unit for generating electricity in a water course, wherein a recess is provided in a shipping container, into which a closed flow-conducting device is inserted, in which a turbine is provided, and wherein a fishway is provided on or in the standard shipping container. The energy generating unit according to the invention meets ecological and legal requirements and can be completely pre-assembled so that it can be set up on site and can be put into operation without any further measures. A further advantage is that the construction costs for installing the energy generating unit can be kept low. In particular, there is no need for construction work that is harmful to the landscape, such as, for example, a power house or a separate fishway.

According to one embodiment of the invention, it is provided that at least one channel, in which no turbine is provided, is arranged in the energy generating unit in the direction of flow of the surrounding body of water. This makes it possible to provide a fishway inside the standard shipping container. Barriers can be provided to reduce the flow rate in this channel. When arranged appropriately, these barriers provide areas with a fast flow and areas with almost stationary water. If the flow path of the water along the fishway has a meandering form, the flow in the fishway is decelerated and the flow rate reduced advantageously.

The energy generating unit can have an alternative embodiment in which a fishway is provided on at least one external side of the standard shipping container, in particular in the direction of flow of the surrounding body of water. On the one hand, this makes it possible to make maximum use of the cross-section of the standard shipping container forming a dam; on the other hand, because the fishway is arranged externally, local conditions of the water course can be taken into account. An existing shallow bankside area can, for example, offer ideal conditions for a fishway, wherein the fishway is created by barriers for slowing down the flow.

In a further embodiment, the barriers can be produced by flexible part bodies, in particular by inflatable and/or water-fillable part bodies. For example, local conditions can be taken into account by inflatable part bodies made from elastic material which adapts to the contour of the bed of the body of water. In order to prevent the part bodies from being buoyant, they are weighed down, it being appropriate for them to be filled at least partially with water.

In a further embodiment, to further protect the fish, a diverting device for fish is provided in the upstream area of the turbine system. There is no risk for small fish when they pass the turbine of the energy generating unit because, owing to their size, they are not caught by the blades. Larger fish can be kept away from the intake to the turbine, for example by means of a grating. When the grating is arranged appropriately, the larger fish are even guided directly to the fishway.

In a further embodiment, it is provided that inflatable and/or water-fillable bodies, which enable a fundamental seal within the bed of the body of water, are provided on the external sides of the standard shipping container. The damming effect is thus increased and can be adjusted as required. Depending on requirements, it may not be advisable to completely dam flowing water in order to, for example, avoid flooding in the upper reaches. Precise damming is enabled by the flexible bodies.

In a further embodiment, the turbine system can be provided with a closed diffuser through which the water flows, which additionally increases the efficiency of the system. Because a conventional pump impeller is used as a turbine wheel, it is possible to respond flexibly to the requirements of the respective site.

In a further advantageous embodiment, the downstream entry to the fishway is arranged transverse to the direction in which the river flows. It is advantageous here that the entry lies in a region in which the flow is calm. The outlet of the diffuser, at which there is a relatively high flow, is situated in the immediate vicinity of this entry.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a second alternative embodiment of the energy generating unit according to the invention.

DETAILED DESCRIPTION

Figure 1:
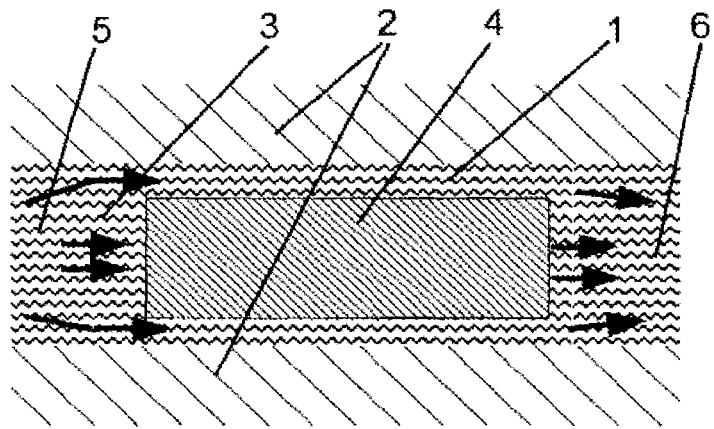
FIG. 1 shows an energy generating unit, viewed from above, in the direction of flow of the body of water and from the side in accordance with an embodiment of the present invention.
Figure 1:
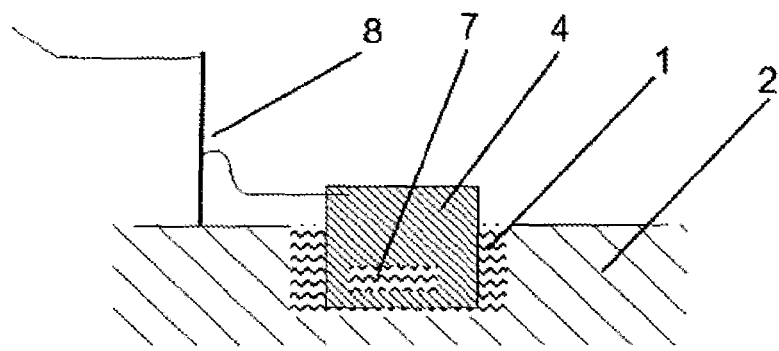
Figure 1:
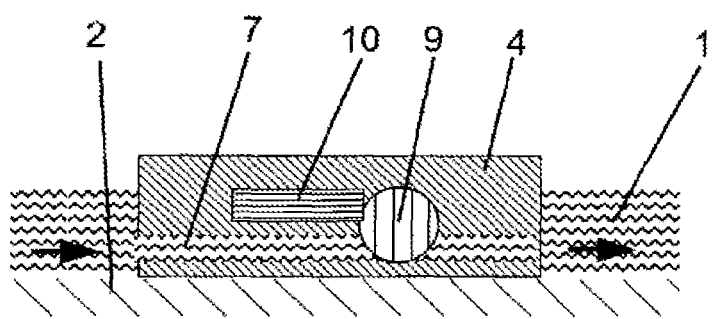

A body of water 1, in particular flowing water, is shown in FIG. 1, it being advantageous if the banks and the bed 2 of the body of water 1 run as straight as possible. The direction of flow 3 is indicated by arrows. When there is a sufficient flow, it is advisable to introduce an energy generating unit into the body of water 1, it being accommodated in a standard shipping container 4, as shown in FIG. 1. This standard shipping container 4 dams the body of water 1 so that there is a difference in level between the upstream side 5 and the downstream side 6. This difference is compensated by the water flowing laterally past the standard shipping container or, as shown in the middle of FIG. 1, through a channel 7 provided in the standard shipping container 1. A section through the standard shipping container 1 is shown in the lower part of FIG. 1, a turbine 9 and a switch box 10 being shown schematically, the switch box 10 representing all the components which are necessary for converting the mechanical kinetic energy of the turbine into electrical energy. The electrical energy generated is guided through a cable 8 to a consumer unit or fed into an existing network. The arrangement shown corresponds essentially to the already known prior art.

Figure 2:
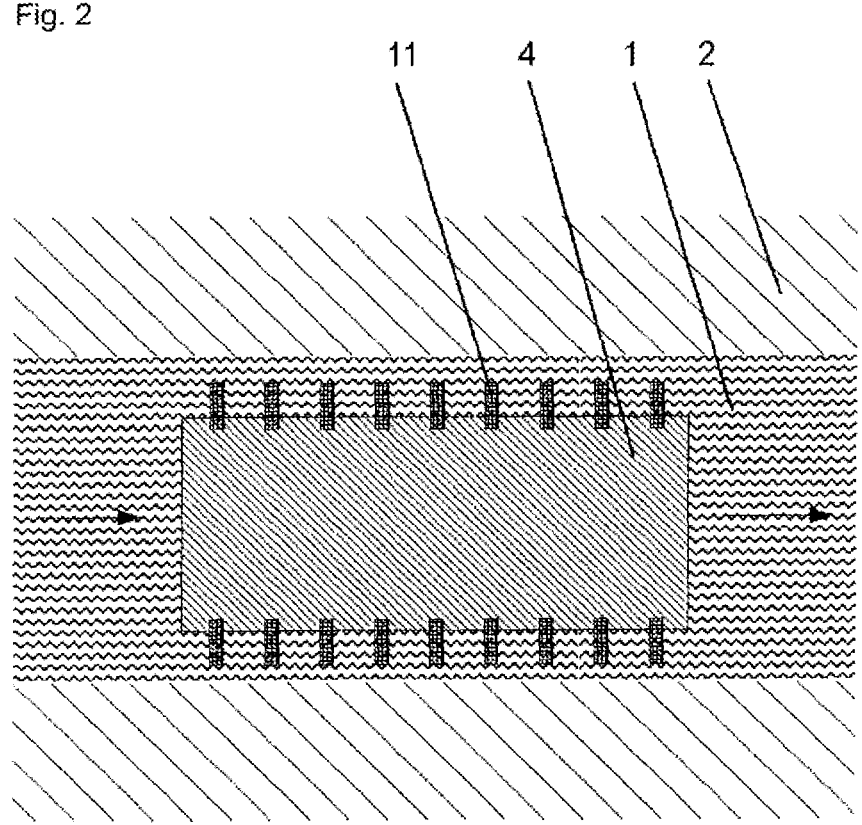
FIG. 2 shows a first alternative embodiment of the energy generating unit according to the invention.

A first alternative embodiment of the energy generating unit according to the invention is shown in FIG. 2. The standard shipping container 4 is arranged in the body of water 1. The inside of the standard shipping container 4 is equipped as in the example shown in FIG. 1 or FIG. 3. The standard shipping container 4 divides the flow of water into a part that flows through the channel 7 through the inside of the standard shipping container 4 and discharges its energy to the turbine there, and a part that flows laterally past and under the standard shipping container 4. According to the invention, at the sides that face the bank and the bed of the body of water 2, the standard shipping container 4 has flow barriers 11 which reduce the flow of water in the edge area. The flow of water around the standard shipping container 4 is decelerated but is not completely stopped. In this partial flow of the body of water, fish and other aquatic animals are able to pass by the energy generating unit unharmed. Other flow barriers which are attached from the bankside in such a way that a meandering flow of water occurs are not shown in FIG. 2.

In the form shown, the energy generating unit according to the invention can be introduced very flexibly into the bed of the body of water. It can be used directly to generate electrical energy without almost any further expense. If the energy generating unit is removed from the bed of the body of water, no other structures need to be removed apart from the standard shipping container.

FIG. 3 shows a second alternative embodiment of the energy generating unit according to the invention in plan view. The arrangement of channel 7 and turbine 9 can be seen in the cross-section of the standard shipping container 4. In addition, a further channel 12 is shown which is designed as a fishway. The flow through this further channel 12 is decelerated by flow barriers 13. On its external sides, the standard shipping container 4 has flow barriers 11' which seal the area between the standard shipping container 4 and the bank 2. As a result of this seal, the damming effect of the energy generating unit can be adapted according to the requirements for energy generation and to the local marginal conditions of the body of water. For optimal adaptation to the geometry of the bank area and the bed of the body of water, the flow barriers 11' are produced from an elastic material which can be pumped up like a balloon, the surrounding water being suitable for filling them. The location and filling process for the flow barriers 11' are designed in such a way that the local ecosystem is minimally affected; in particular for example, a protective grating in the region of the flow barriers 11' prevents individual fish from being trapped between two flow barriers 11' during the filling process.

LIST OF REFERENCE NUMERALS

1 Body of water
2 Bank/bed
3 Direction of flow
4 Shipping container
5 Upstream side
6 Downstream side
7 Channel
8 Electricity network
9 Turbine
10 Switch box
11 Flow barrier
12 Fish ladder
13 Flow barrier The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An energy generating unit for generating electrical energy from water power, comprising:
   a commercially available standard shipping container insertable into a surrounding body of water having a flow direction;
   at least one turbine system installed in a channel extending inside the commercially available standard shipping container in the flow direction; and
   at least one fishway provided at least one of in the commercially available standard shipping container and on at least one external side of the commercially available standard shipping container,
   wherein at least one of the at least one fishways provided on at least one external side of the standard shipping container is arranged in the flow direction of the surrounding body of water, extends between the shipping container and a bank of the body of water, and includes a plurality of inflatable flow-slowing barriers configured to be inflated by at least one of a gas and a liquid, the plurality of inflatable flow-slowing barriers extending partially between the at least one external side of the standard shipping container and the bank of the body of water such that flow along the at least one external side of the standard shipping container is not stopped.

2. The energy generating unit as claimed in claim 1, further comprising:
at least one further channel extending inside the commercially available standard shipping container in the flow direction in which no turbine is provided.

3. The energy generating unit as claimed in claim 2, further comprising:
flow-slowing barriers provided in the further channel.

4. The energy generating unit as claimed in claim 1, wherein
the at least one turbine system includes a centrifugal pump impeller as a turbine wheel.

\* \* \* \* \*